United States Patent [19]
Funk et al.

[11] Patent Number: 5,979,302
[45] Date of Patent: Nov. 9, 1999

[54] OVEN WITH SLIDE-OUT TRANSFER GUIDES

[75] Inventors: Garrett T. Funk, Fullerton; Agustin G. Partida, Bellflower, both of Calif.

[73] Assignee: Casa Herrera, Inc., Pomona, Calif.

[21] Appl. No.: 09/038,859

[22] Filed: Mar. 11, 1998

Related U.S. Application Data

[63] Continuation-in-part of application No. 08/769,497, Dec. 18, 1996, Pat. No. 5,749,283.

[51] Int. Cl.$^6$ ............................... A23L 1/00; A47J 37/00; A21B 1/42
[52] U.S. Cl. ............................. 99/339; 99/352; 99/355; 99/386; 99/423; 99/443 C; 99/477
[58] Field of Search ..................... 99/339, 340, 352–355, 99/386, 423, 443 R, 443 C, 477–479, 483; 126/21 A; 219/388; 198/402, 403, 560, 603, 609; 414/151, 152, 415; 426/502, 439, 233, 523, 243, 296; 432/129, 194, 249

[56] References Cited

U.S. PATENT DOCUMENTS

| | | | |
|---|---|---|---|
| 2,822,942 | 2/1958 | Lanham | 198/560 |
| 3,478,704 | 11/1969 | Ford | 414/152 X |
| 3,993,788 | 11/1976 | Longenecker | 426/502 |
| 4,154,152 | 5/1979 | Lang-Ree et al. | 99/386 |
| 4,309,938 | 1/1982 | Harmon | 99/477 |
| 4,508,025 | 4/1985 | Schultz | 99/423 |
| 4,530,632 | 7/1985 | Sela | 414/788.9 |
| 4,549,477 | 10/1985 | McCabe, Jr. | 99/477 |
| 4,571,341 | 2/1986 | Sugimura | 426/523 |
| 4,600,596 | 7/1986 | Gongwer et al. | 99/443 C |
| 4,711,164 | 12/1987 | Mendoza | 99/339 |
| 4,719,272 | 1/1988 | Mendonza | 99/339 |
| 4,978,548 | 12/1990 | Cope et al. | 99/352 X |

*Primary Examiner*—Timothy Simone
*Attorney, Agent, or Firm*—Myers, Dawes & Andras LLP

[57] ABSTRACT

An oven with slide-out transfer guides is provided for use in conjunction with multiple conveyor ovens to provide quick and convenient accessibility to an oven's interior in case of product transfer difficulties. A slidable rail assembly is mounted in the oven, which also has an access port for transfer guide egress and ingress, and a transfer guide with opposed lips forming a slot which mounts the transfer guide on the rail assembly. When access to the oven's interior is necessary to remedy a product transfer problem, the oven of the present invention allows the transfer guide to slide along the rail while still supported by same, and said transfer guide can be partially removed from said oven without the need to turn off the oven. In this way, obstructions can be cleared quickly without significant down time, thereby saving the user both time and expense. The transfer guide may be implemented in a smaller, conventional oven by supporting a middle bearing block vertically to provide clearance for sliding the guide and, if desired, by locating the manifold and drive mechanisms together on an opposite side of the oven.

5 Claims, 9 Drawing Sheets

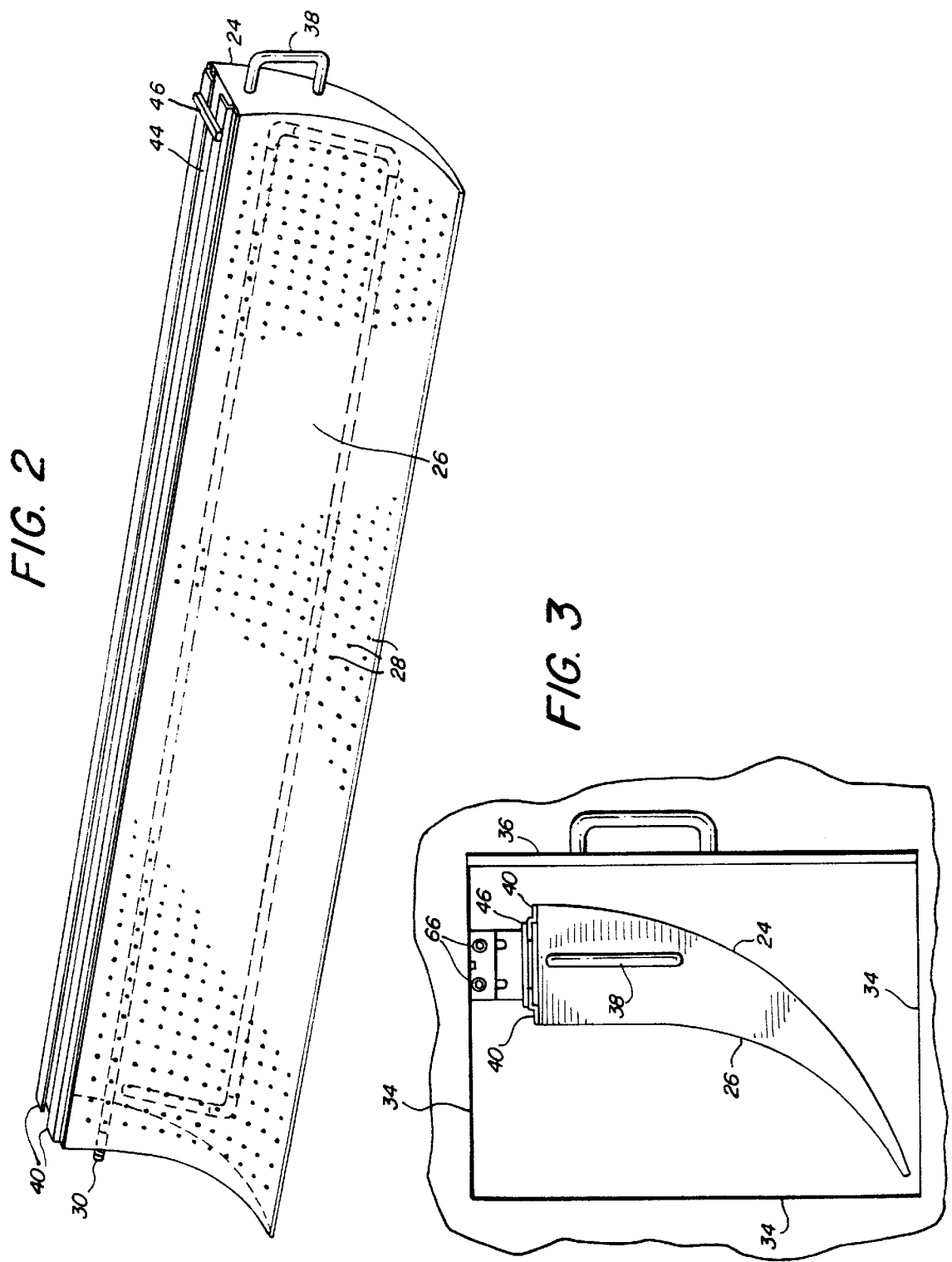

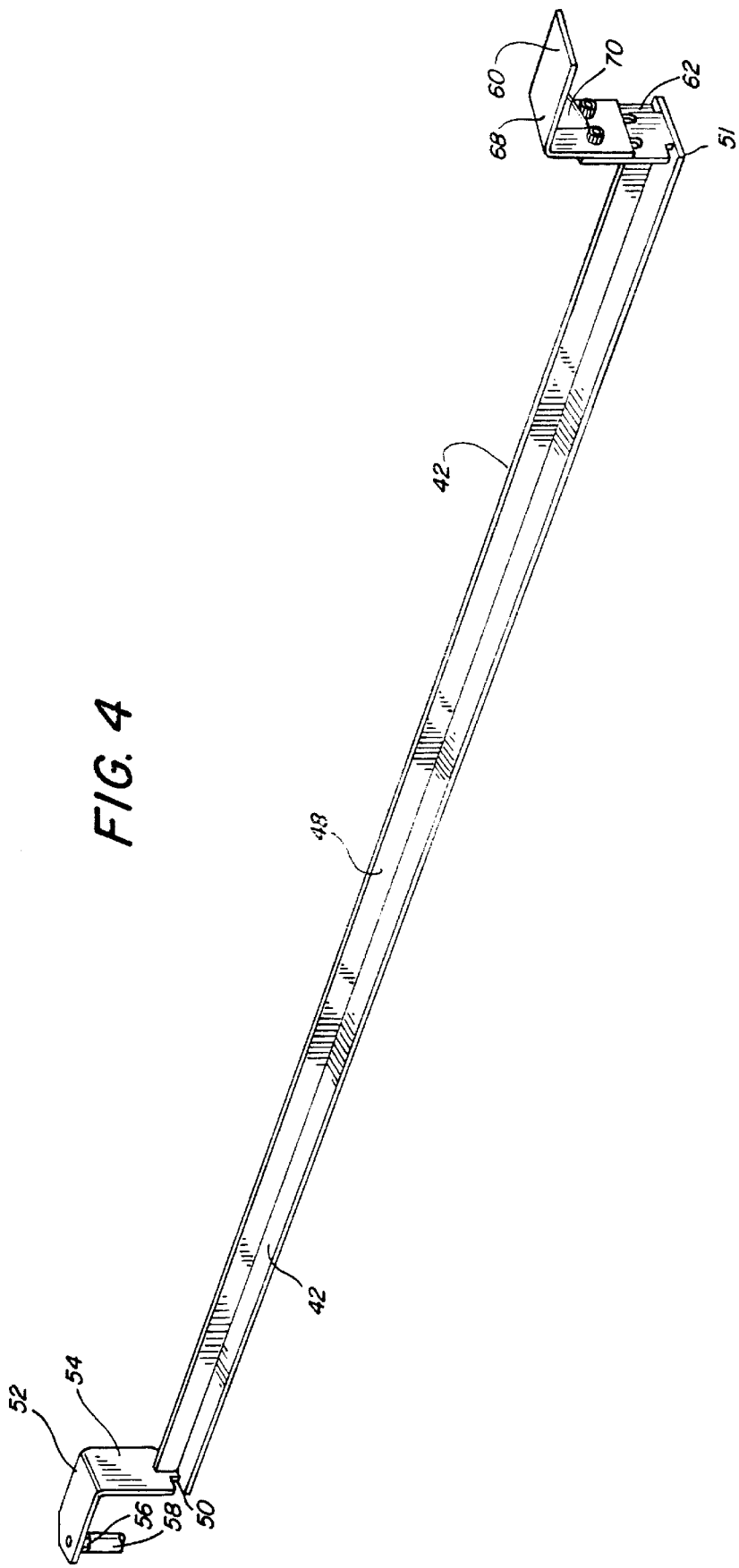

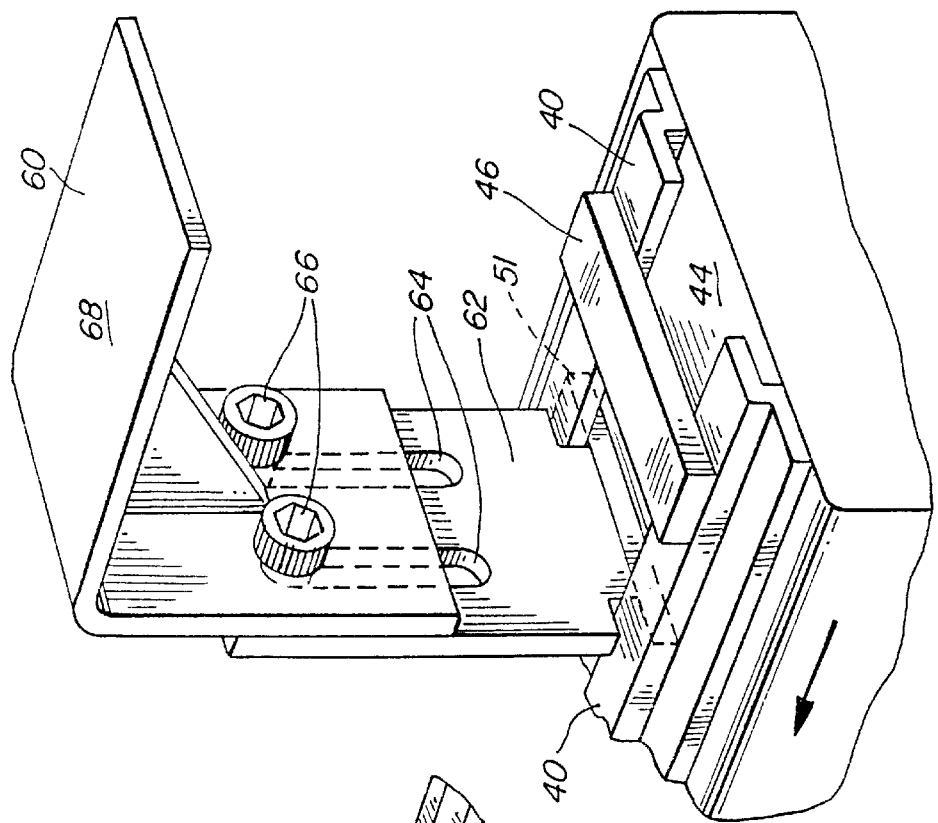
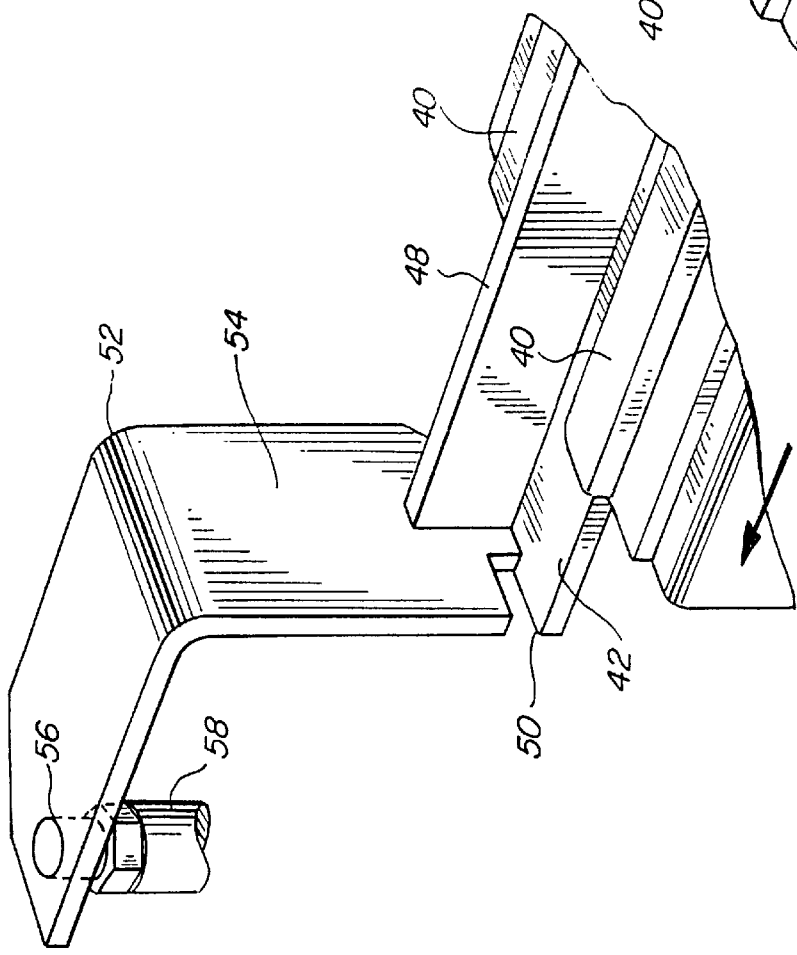

OVEN WITH SLIDE-OUT TRANSFER GUIDES

BACKGROUND OF THE INVENTION

This application is a continuation-in-part of U.S. patent application, Ser. No.: 08/769,497, filed on Dec. 18, 1996, now U.S. Pat. No. 5,749,283.

FIELD OF THE INVENTION

The present invention relates generally to commercial ovens and, more particularly, to an oven with multiple conveyors for transporting items therein having slidably removable transfer guides to provide greater accessibility to the oven's interior in the event of product transfer problems.

DESCRIPTION OF RELATED ART

Large commercial baking ovens used in the field of comestibles such as tortillas typically employ conveyers to communicate the items within the oven during the baking process. An oven of this variety can have many conveyors vertically spaced in parallel rows and the path defined by the motion of the conveyors follows a serpentine path from the uppermost conveyor to the bottom conveyor. In a large commercial baking oven, dough sheets enter the oven at the top and are deposited on the upper conveyor, which transports the dough sheets across the length of the oven while the sheets are being exposed to the environment of the oven's interior baking region. As the dough sheets reach the end of the upper conveyor, they are transferred to the next lower conveyor which transports the dough back across the oven in the other direction. This process is repeated so that the dough sheets reach the bottom conveyor and are transported out of the oven after completing the baking process.

Each conveyor is comprised of an endless belt mounted on a series of rollers, with one roller typically driving the belt while the other rollers guide the belt and maintain its alignment. The tension in the belt must be maintained because the roller which drives the conveyor is usually a friction driven system; that is, the only force operating on the belt is the friction generated by the tension of the belt on the roller. Only a sufficiently tightly wound belt will have the necessary friction to maintain the drive roller contact without slipping. The belts are often times a wire mesh construction, which is flexible enough to be mounted and to turn on a roller but strong enough to withstand the temperatures and stresses generated in the belt in the operation of the conveyor. Adjacent belts are rotated in opposite directions such that the exit end of one belt will necessarily coincide with the beginning end of the next belt. Items completing the path across the belts must be transferred to an adjacent lower belt where it returns across oven, and so on. The belts are usually wide enough for and are designed to transport multiple rows of items and maintain the items in rows to preserve the necessary spacing often needed for baking applications.

The process by which the items are transferred in the oven from an upper conveyor to a lower conveyor can be accomplished by many means, but perhaps the most common and efficient method is by use of a transfer guide or chute placed at the end of the upper conveyor. This method, which is gravity driven to move items to the next lower level, is especially suited for nonfragile items due to the dropping or falling manner in which items are transferred. The transfer guide is mounted within the oven adjacent to the end of a conveyor, and adapted to receive items which reach the end of the conveyor and either fall off the edge or received by the guide just prior to the items falling. Transfer guides are well known in the art and typically have a curved surface for receiving the items coming off the conveyor and safely transferring the items to the next lower conveyor. The curvature of the guides both catch the items as they exit the first conveyor and slow the item's descent prior to their deposit on the next conveyor. These guides usually span the width of the oven and can transfer entire rows of items, and the items remain in rows when they are deposited on the next conveyor.

The transfer guides are designed to quickly transfer the items and, in some cases, the items are inverted to ensure uniform baking. For tortillas, the transfer guide is designed and positioned such that the flattened dough sheets reach the end of the first conveyor and fall onto the guide upside down, sliding along the transfer guide to the edge of the next conveyor where it is deposited thereon. The new conveyor receives the dough sheets with the uncooked side now exposed and transports them across the oven and so on, with each pass of the oven cooking an alternate side of the dough sheets.

One difficulty which arises with this procedure occurs when the transfer guide fails to successfully transfer the dough sheets, or other items, to the next conveyor. This can occur for a number of reasons such as an unusual consistency of the dough causing the item to stick to the guide, having a dough sheet become wedged between the conveyer and the transfer guide, or an odd-shaped sheet which becomes trapped. When one of these situations occur, the problem can lead to a piling up of the successive sheets, which can result in an impasse where no dough sheets can get through and the oven becomes clogged with dough sheets. This occurrence can result in a potentially dangerous situation as the tortillas can catch fire when exposed for too long in the oven. Furthermore, the situation requires that the oven be turned off and allowed to cool so that the path can be cleared safely. This results in extended down periods and the loss of operation as the oven cools and then reheats, which has led the art of oven construction to continuously addressed this situation.

To avoid this problem, transfer guides have used various methods to eliminate the bunching or clogging of the items in the oven as they are transferred from one conveyor to the next. The transfer guides are polished to a smooth surface to attempt to eliminate friction from causing the tortillas to stick to the transfer guides. Transfer guides also have been equipped with small air holes on the receiving surface and compressed air is supplied to the guide's interior cavity which generates a column of air on the surface. This blowing method is effective for keeping items such as tortillas from sticking to the surface of the transfer guide and for facilitating the transfer process, but is not completely effective and the problems relating to oven clogging described above continue to plague the industry. The present invention has taken a new approach to the problem.

The prior art is still seeking to eliminate the occurrence of the bunching or clogging of the oven between conveyors as the items are transferred from one level to another. The present invention seeks to reduce the inconvenience and delay when such an occurrence does happen. The oven of the present invention is provided with slidable transfer guides which may be removed from the oven through a specially designed access port, thereby allowing the transfer guide and any accompanying obstruction to be cleared quickly without the need to turn off the oven. Additionally, the transfer guides can be quickly cleaned if the surface becomes dirty or rough to prevent the clogging of the oven. Mounted on support brackets which permit it to slide into and out of the oven when needed, the transfer guide of the present invention provides quick and easy access to the internal oven compartment. Using this method, impasses can be cleared in a matter of seconds, often requiring only that the transfer guides be jostled or removed and replaced without the need to turn off the oven. At most, the conveyors may need to be stopped and restarted after clearing the path which can be completed in a matter of moments.

The clogging problem is compounded in a small oven because of space constraints. A small tortilla oven typically has three tiered conveyor belts that move the tortillas back and forth within the oven for a sufficient time to bake the product. The tortillas enter at a near end of the oven and ultimately exit at the opposite far end. The tortillas travel forward on a top belt, backward on a middle belt, and forward on a lower most belt. In order to transfer the tortillas from one conveyor belt to the next, the upper conveyor belt typically terminates slightly before the start of the lower belt so that the tortillas will fall from one belt to the next. A slide is conventionally provided between the two belts in order to gently guide and flip the tortilla over as it drops from one belt to the next. As can be appreciated from the foregoing description, a small, three tiered oven has two slides—a first slide between the top and middle belts at the far end of the oven, and a second slide between the middle and lower belts at the near end. The first slide is usually a power driven mesh belt because it resides in an uncrowded area of the oven. The second slide, however, is usually a stationary slide-plate because of its crowded location.

The near end of the conventional tortilla oven includes horizontal bearing blocks which rotatably support driven rollers that support the conveyor belts, a drive means including a motor, chains, and sprockets on the shafts of the driven rollers, and a fuel delivery system including a blower, air/fuel mixers, and header pipes. A common problem with the small tortilla oven, therefore, is that the second slide clogs up or otherwise becomes soiled with tortilla debris, but is generally inaccessible. A clogged slide can damage product or even cause an enormous product backup that shuts down the entire line. It is necessary therefore to periodically clean the slide and remove the debris in order to maintain sanitary conditions and desired operability of the slides. The first slide being located between the top and middle belts is generally easily accessible for cleaning because it is located near the top of the oven and at the far end, away from the conveyor belt drive mechanism and fuel system. The second slide, however, is notoriously difficult to clean because it is "buried" inside the near end of the oven. It is at the middle belt, between the upper and lower belts. It is surrounded by the horizontal frame members and bearing blocks that support the driven rollers. It is also generally surrounded on one side by the motor, chains, and sprockets, that drive the conveyor belts, and on the other side by the oven manifolds that deliver fuel and air to headers and ribbon burners that are positioned inside of the belts throughout the length of the oven. Because of its location, the second slide is usually mounted permanently within the oven and is usually cleaned, if at all, by inserting a broom from a top end of the oven and blindly sweeping debris to the side and out the bottom of the oven.

As can be appreciated from the above description, there exists a need in the art for a tortilla oven which enables the second slide to be removed for cleaning.

OBJECTS AND SUMMARY OF THE INVENTION

The present invention is directed to an improved oven equipped with conveyors, the improvement comprising a slide out transfer guide designed to permit quick access to the oven's baking compartment in order to clear obstructions in the oven's path. It is an object of the present invention to provide an oven having rapid access capability to an oven's internal baking compartment without requiring the oven to be turned off. It is another object of the present invention to provide a transfer guide for an oven which easily slides out of said oven. It is another object of the present invention to provide a mounting apparatus and access port for an oven that will accommodate a slide out transfer guide.

In a first aspect, the present invention comprises an improved tortilla oven having a plurality of conveyor belts stacked one on top of the other in a tiered arrangement; means for driving the plurality of tiered conveyor belts and manifold means for delivering a fuel-air mixture to oven burners that are collectively located on a first side of the tortilla oven; transfer slide means for transferring a food product carried on the conveyor belts located at alternate successive ends of the plurality of tiered conveyor belts; and means for slidably extending a transfer slide located adjacent the drive means and manifold means out of a second opposite side of the tortilla oven.

In a second aspect, the present invention comprises an improved tortilla oven which repositions the frame members, and bearing blocks, which combines the conveyor belt drive means and the oven manifold on only one side of the oven and which provides a second slide that may be easily removed from the other side for cleaning.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is an oblique view of the first transfer guide of the present invention illustrating the handle position and mounting apparatus;

FIG. 3 is a profile view of the first transfer guide of the present invention through the access port;

FIG. 4 is an oblique view of the oven's supporting beam from which the first transfer guide is slidably mounted;

FIG. 5 is an enlarged view of the mounting configuration of the transfer guide's mounting bracket on the oven's distal end; and FIG. 6 is an enlarged view of the mounting configuration of the transfer guide's mounting bracket on the oven's proximal end.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to commercial ovens with slide out transfer guides.

Figure 1:
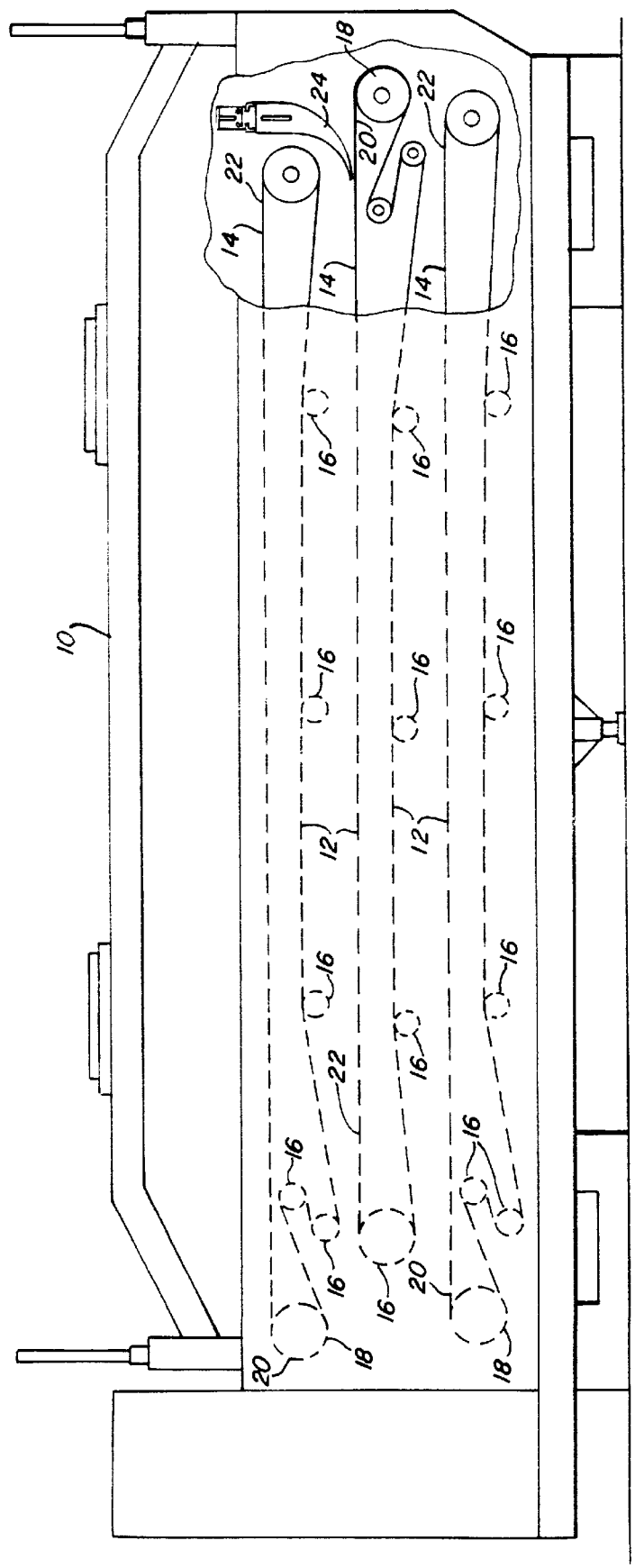
FIG. 1 is a side view of a first oven illustrating in the cut-away section a typical position of a first slidable transfer guide of the present invention.

The present invention is directed to an oven having transfer guides which are adapted to slide into and out of the oven easily and quickly without requiring the oven to be turned off. Using an access port in the side of the oven to access the transfer guide, a user can remove impediments or clear obstructions which accumulate on the transfer guide during operation. The oven 10 of the present invention is shown generally at FIG. 1. Conveyors 12 rotate in the oven to communicate items such as tortillas (not shown) from the top conveyor to the next lower conveyor and so on until the items reach the bottom conveyor, where they exit the oven 10 to be collected or otherwise transported for further processing. The conveyors 12 are comprised of endless belts 14 typically of a wire mesh construction mounted on a series of rollers 16. One of the rollers 18 is driven by a motor (not shown), which in turn drives the belt 14 on its endless path within the oven 10. All or substantially all of the conveyor 12 lies within the oven's baking environment such that items on the conveyor 12 are baked as they follow the paths defined by the series of belts 14.

Each conveyor 12 has a receiving end 20 for receiving the items and a transfer end 22 where the items exit the conveyor to be transferred to another conveyor or to exit the oven. At the transfer end 22 of each conveyor 12 is a transfer guide 24, shown generally in FIG. 2. The transfer guide 24 generally has a curved front surface 26 for receiving the items as they exit the conveyor and which serves to both slow the item's descent and provide the item with some forward momentum to assist in the transfer to the next conveyor. Items exiting the transfer end 22 of the conveyor 12 have some forward momentum as they exit the belt 14 and fall onto the transfer guide 24. Furthermore, an item such as a tortilla will tend to rotate as it falls such that the surface initially face down on the first conveyor belt will face up on the second conveyor belt. In this manner, the tortilla cooks more evenly and consistently that methods which do not invert the item.

The transfer guide 24 is provided with a plurality of apertures 28 on the front surface 26 which extend to an interior cavity of the transfer guide. An air supply is connected to the transfer guide 24 at a valve 30 provided on the end of the transfer guide 24 during operation of the oven and is communicated within the transfer guide's internal cavity by means of an air pipe 32. The air pipe 32 has holes therein which fill the cavity with compressed air, which in turn escapes through the apertures 28 in order to produce a column of air over the surface of the guide 24. The column of air deters the accumulation of debris on the guide and resists sticking of the items to the guide 24 which may cause an obstruction.

The oven 10 of the present invention is equipped with access ports 34 on the side of the oven wall aligned with the transfer guides 24, shown generally in FIG. 3. The access ports 34 can be sliding doors or hinged doors 36, but should provide quick access to the oven's interior while maintaining thermal insulation when not in use. The access ports 34 are sized to permit a transfer guide 24 to slide through the opening easily and provide some room to reach into the oven's interior with an elongated tool and remove any clogging items. The transfer guide 24 of the present invention has a handle 38 for grasping on the end which is exposed to the outside of the oven when the access port 34 is open. Using the handle 38, a user can pull the transfer guide 24 out of the oven 10 while the transfer guide 24 remains suspended by its support means, discussed below. The operation of the transfer guide is independent of the conveyors 12 or the operation of the rest of the oven such that the transfer guides 24 can be slidably removed while the oven is in operation. This feature allows any obstruction to be cleared without significant interference with the operation of the oven. For example, if an obstruction occurs which requires that the interior of the oven be accessed, it is only required that the introduction of additional items to the conveyor be temporarily halted and the access port 34 be opened. The transfer guide 24 can be grasped by the handle 38 and slid from the oven's interior to preferably clear the passage of the conveyor 12. If the passage is not cleared by removing the transfer guide 24, a tool can be used to break up any congestion and clear the passage. The transfer guide 24 can be quickly slid back into position and the assembly line restarted with minimum interruption.

The transfer guide 24 is mounted in the oven 10 in such a way as to provide a sturdy support for the guide in its operational position while permitting the guide to slide back and forth through the access port when necessary. To accomplish this, the transfer guide 24 includes opposed brackets 40 on the upper surface which are designed to fit on a beam 42 aligned with the access port 34. The brackets 40, as shown in FIG. 2, typically span the length of the transfer guide 24 and form a slot 44 therebetween and which can support the weight of the transfer guide 24. At the proximal end of the slot 44 is a stop bar 46 which serves to stop the guide from sliding to far into the oven. The stop bar 46 is usually welded across the brackets 44 to provide a permanent stop, although less permanent means of fixing the bar on the brackets can be used.

The oven has a mounting assembly as shown in FIG. 4 spanning the width of the oven to support the transfer guide 24 in the oven 10 and to permit the sliding action into and out of the oven. The transfer guide 24 is suspended from a beam 42 which spans the oven and is aligned with the access port 34 to permit the transfer guide 24 to slide along the beam 42 through the access port 34. The beam 42 has a main segment with a profile of an inverted T, which allows the brackets 40 of the transfer guide to mount onto the beam 42 and slide along the beam while it is supported in the vertical direction. The vertical component of the inverted T is a web 48 which is used to strengthen the beam 42 and resist bending of the beam without impeding the sliding path of the transfer guide 24. At the distal end of the beam 50 is an L-shaped plate 52 having a first surface 54 orientated perpendicular to both the plane of the web 48 and the upper surface of the transfer guide. The L-shaped plate 52 is used to mount the beam 42 to the oven wall and is secured to the oven wall via the pin shown in shadow in FIG. 5. The juncture of the beam 42 with the L-shaped plate 52 is typically welded to create a permanent joint. The pin 56 is also welded to the L-shaped plate 52 and mates with the mating slot 58 which is secured to the oven wall, thereby fixing the beam 42.

At the proximal end of the beam 51, as shown in FIG. 6, another L-shaped plate 60 is used to secure the beam 42 to the opposing oven wall. The beam 42 is connected to a first support plate 62 orientated perpendicular to the beam and having elongated vertical slots 64 therein. The slots 64 are used to position the transfer guide 24 in the oven by cooperating with two fasteners 66 which secure the support plate 62 to the second L-shaped plate 60. The upper surface of the second L-shaped plate 68 is secured to the oven wall using either fasteners or a welded joint (not shown). Both L-shaped plates 52,60 are provided with traverse webs 70 to strengthen the plate and resist bending.

The following assembly provides the transfer guide with a rigid, sturdy, but removable support station which allows the transfer guide to easily slide along the beam in a longitudinal direction while remaining fixed in all other directions. With the access port open, the handle can be used to pull the transfer guide out of the oven. When the obstruction is cleared, the transfer guide can be reinserted into the oven using the handle until the stop bar prevents the transfer guide from sliding too far and damaging the oven wall.

Figure 7:
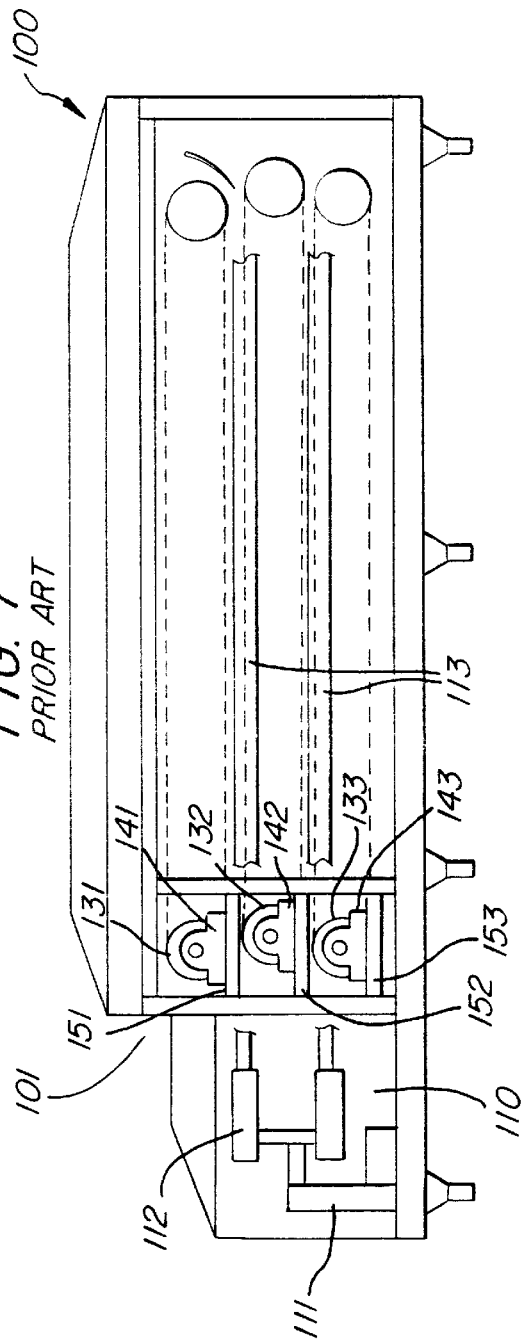
FIG. 7 is a right side view of a conventional tortilla oven showing how the second slide is trapped on the right behind the manifolds, the bearing blocks, and horizontal frame pieces.
Figure 8:
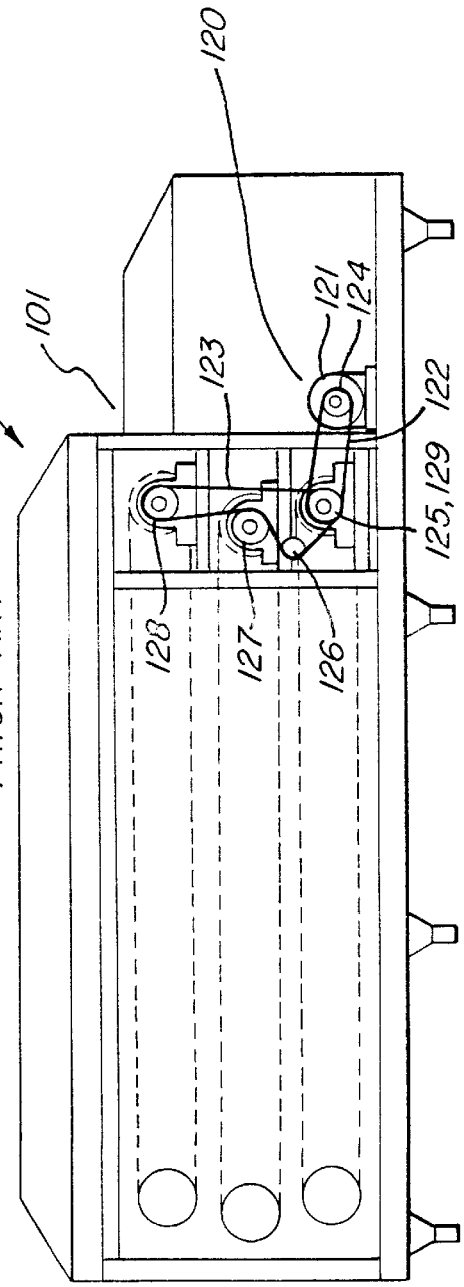
FIG. 8 is a left side view of the conventional oven of FIG. 7 showing how the second slide is trapped on the left behind the motor, chains, and sprockets, the bearing blocks, and horizontal frame pieces.

A pull-out slide can also be incorporated in a smaller, conventional oven if certain unique modifications are made to the oven. As shown in FIGS. 7 and 8, the conventional small tortilla oven 100 has a near side 101 where tortillas enter the oven 100. More significantly, the conventional oven has driven rollers 131, 132, 133 which rotate in bearing blocks 141, 142, 143 carried on horizontal frame members 151, 152, 153. A manifold means 110 is located on the right side for delivering a fuel-air mixture to ribbon burners (not shown) and a conveyor belt drive means 120 is located on the left side for driving the conveyor belts. The drive means and manifold means are usually located on either side of the oven's tiered conveyor belts so that there is enough room to accommodate the various components. As shown in FIG. 8, the conventional drive means 120 includes a motor 121, a pair of sprockets 124, 125 and chain 122 to drive the lower conveyor belt, and a plurality of sprockets 129, 127, 128, an idle sprocket 126, and a slave chain 123 which drives the middle and upper conveyor belts. As shown in FIG. 7, the other side of the conventional oven includes an electric blower 111, mixers 112, and manifolds 113 which connect to headers and ribbon burners to heat the oven. The industry has generally employed this construction because it is difficult to squeeze all of these components to one side, especially in smaller ovens. This makes it virtually impossible to provide a removable slide.

Figure 9:
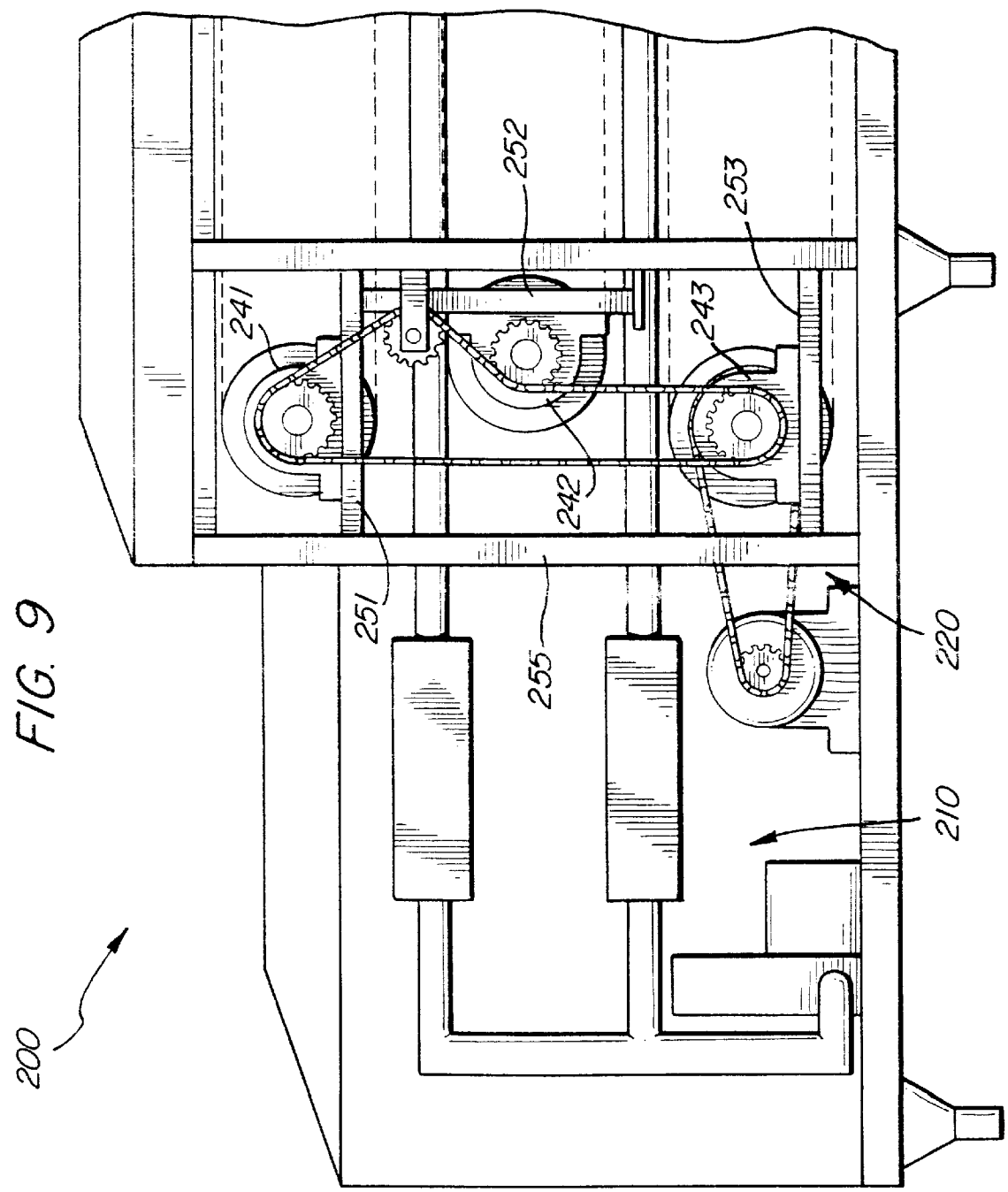
FIG. 9 is a right side view of a tortilla oven according to the present invention wherein the middle bearing block is supported vertically and wherein the conveyor belt drive means and manifold means located on this side of the oven so that the transfer slide may be pulled out of the tortilla oven on the opposite for cleaning.
Figure 10:
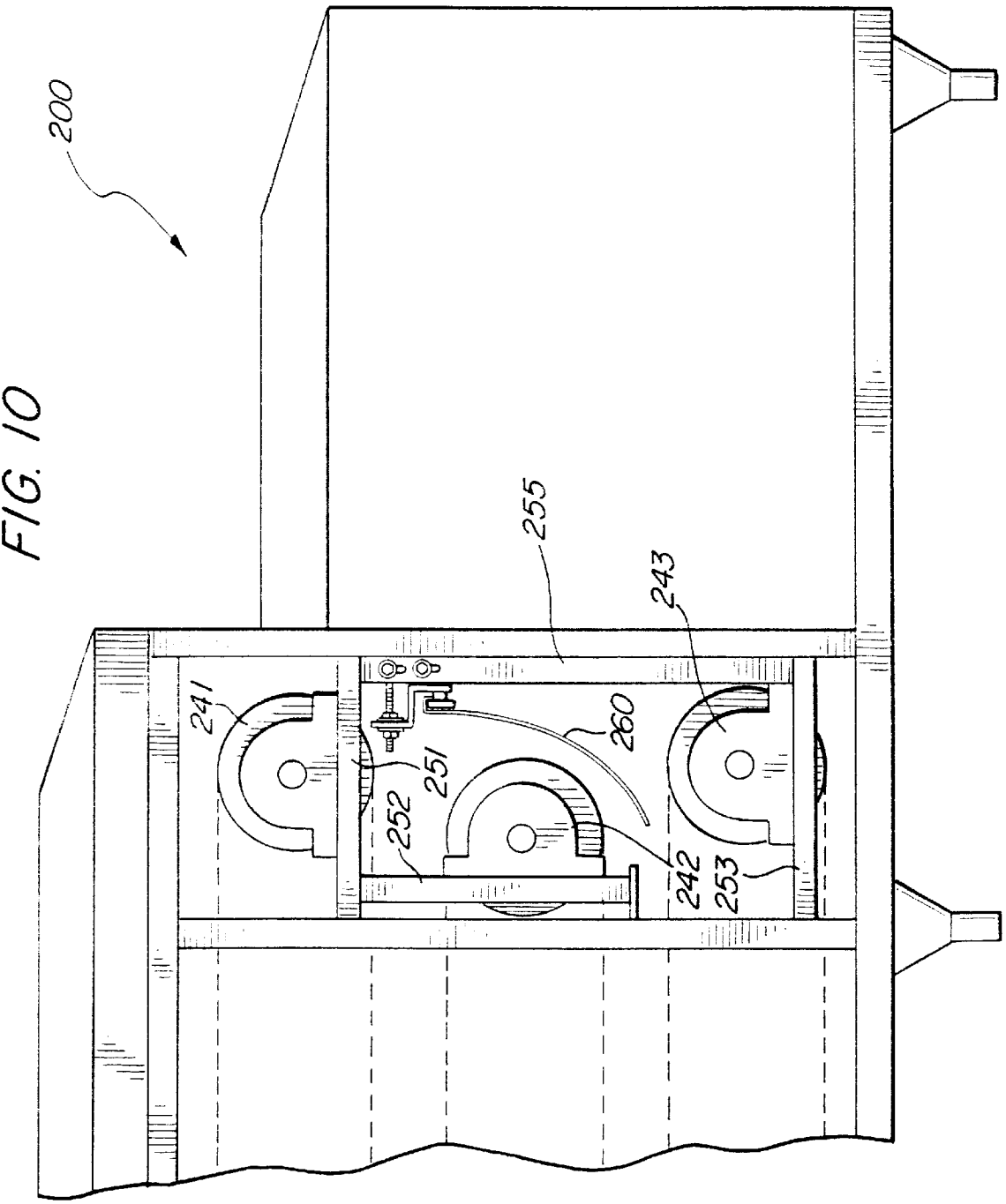
FIG. 10 is a left side view of the oven of FIG. 9 showing how the second slide is accessible.
Figure 11:
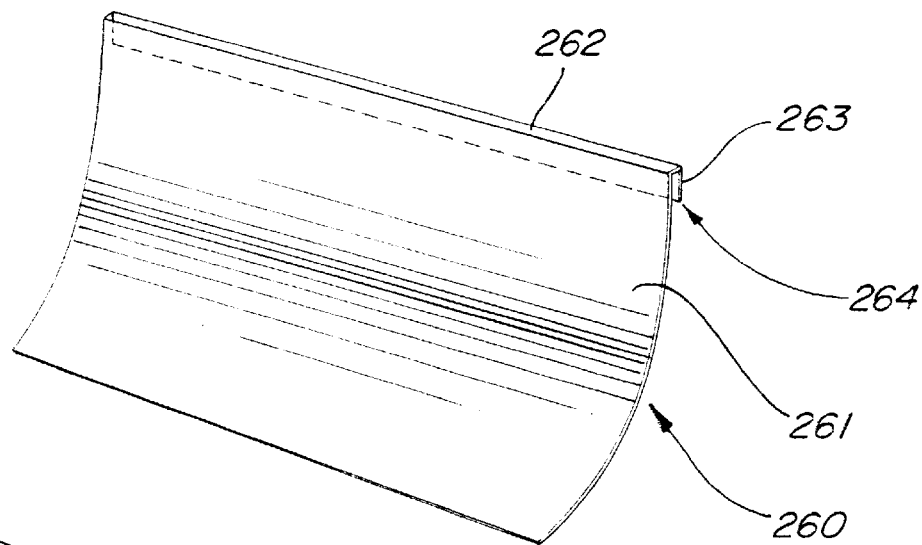
FIG. 11 is a perspective view of a preferred pull-out transfer slide according to the present invention.

As shown in FIGS. 9 and 10, however, an oven 200 according to this invention is uniquely constructed to provide a pull-out slide 240. The pullout slide 240 is made possible by uniquely relocating the middle bearing block 242 on a vertical frame member 252 as shown in FIGS. 9 and 10. This unique repositioning of the middle bearing block 242 provides ample clearance for pull-out slide 240 so that it may be slid out of the oven, provided of course, that nothing else blocks its path. In a preferred embodiment of the present invention, therefore, the manifold means 210 and drive means 220 are both located on the right side of the oven so that the left side of the oven remains clear. This arrangement is best shown in FIG. 9. As shown therein, the actual construction of the manifold means 210 and drive means 220 is very similar to that used in a conventional machine, so its details will not be discussed herein. It should be noted, however, that the middle bearing block 242 on the right side of the oven is, as on the left side, supported on a vertical frame member 252.

There are, of course, many other possible means for driving the first, second and third conveyor belts 11, 12, 13 the one shown and described herein simply being the preferred embodiment. The important thing with respect to the present invention is that the middle bearing block 242 be supported vertically and, preferably, that the means 220 for driving the various conveyor belts be located entirely on one side of the oven, along with the manifold means 210, in order to free up the opposite side of the oven for the reasons describe below.

The vertical frame members 252, in combination with the drive means and manifold means being located on one side of the oven 10, uniquely permits an arcuate transfer slide 260 located between the middle belt 12 and the lower belt 13 to be accessible from an opposite side of the oven. The preferred transfer slide 260 has a main arcuate portion 261, an upper horizontal rib 262 and a vertical rail 263 which define a groove 264. The transfer slide 260 may be pulled directly out of the oven 200 in line with the axle shafts of the conveyor belt rollers. Accordingly, it is a simple matter to stop the oven, remove a side cover, and pull out the transfer slide 260 so that it may be cleaned.

Figure 12:
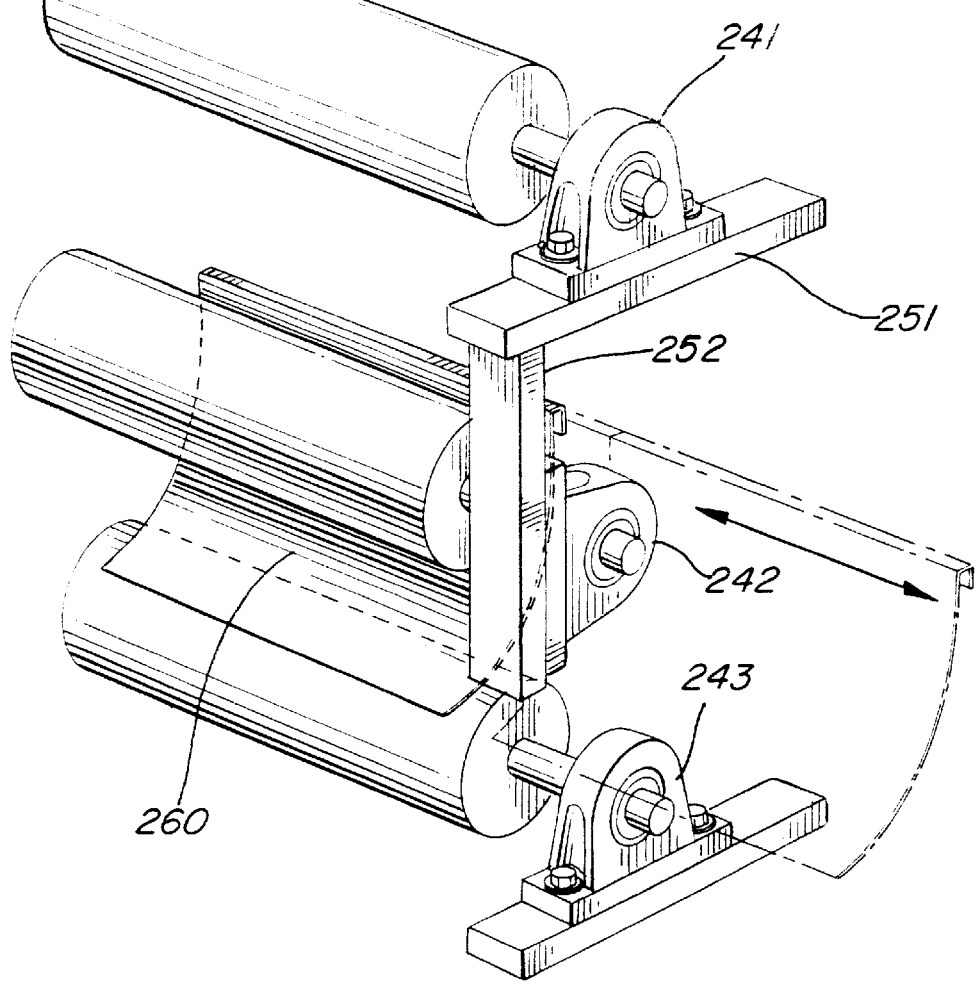
FIG. 12 is a cut-away perspective view showing the slide out operation of the pull-out transfer slide of FIG. 11.
Figure 13:
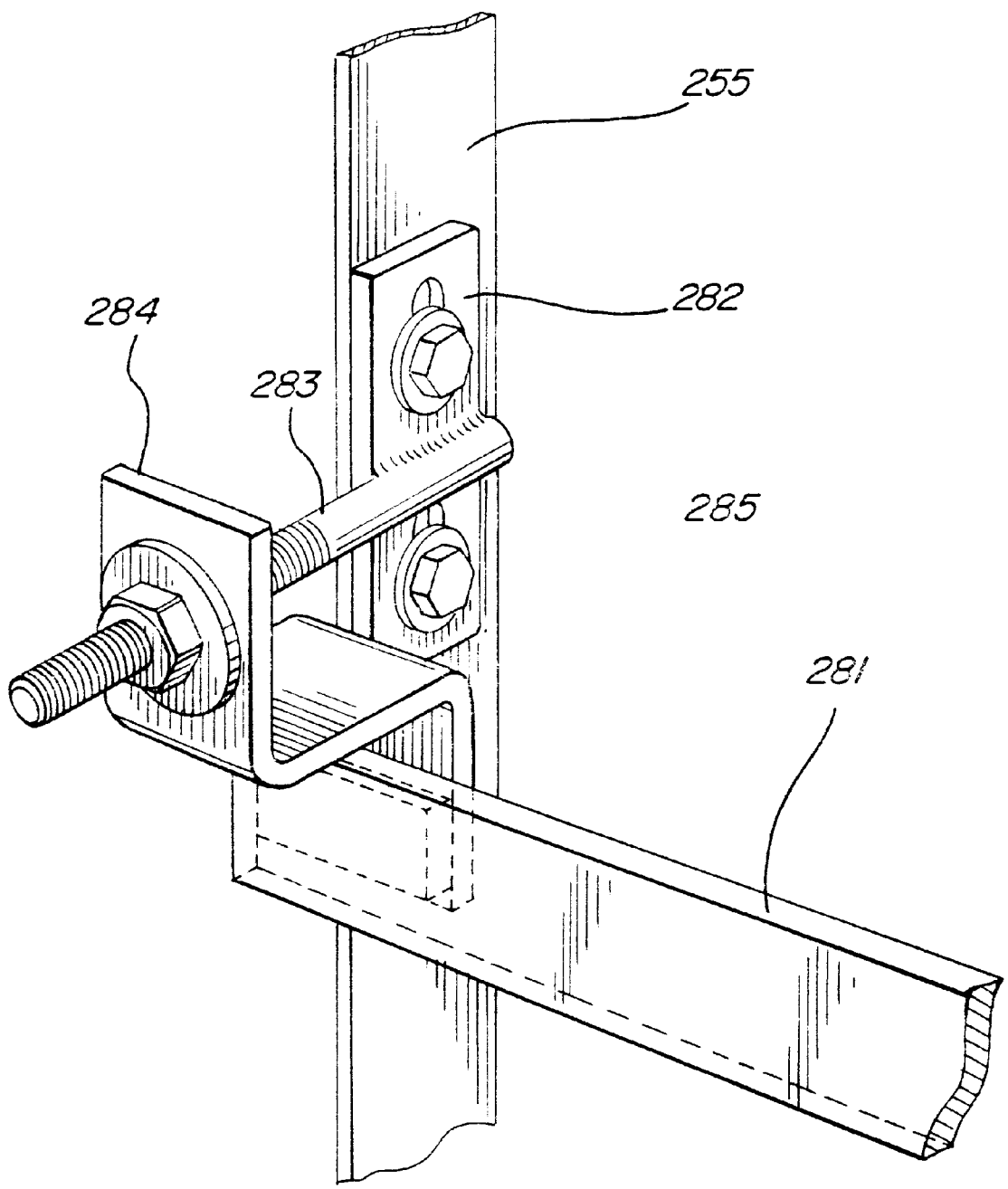
FIG. 13 is a close-up perspective view of the preferred cross-member that slidably supports the preferred pull-out transfer slide of FIG. 11.

FIGS. 12 and 13 illustrate a preferred means 280 for slidably supporting the transfer slide 260 which comprises a cross-member 281 that is supported by appropriate hardware between two vertical members 255 of the oven 200. The preferred supporting hardware comprises a base bracket 282 that is attached to the vertical member 255 with screws or other appropriate means, the base bracket 282 supporting a threaded rod 283 welded thereon which in turn supports a zig-zag support 284 that supports the cross-member 281 using a spacer 285. This hardware beneficially permits the groove 264 defined by the horizontal rib 262 and vertical rail 263 to slide unobstructed along the cross-member 281. It is certainly possible, of course, to slidably support the transfer slide 260 using another mechanism, the mechanism just shown and described merely being a preferred embodiment.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved tortilla oven comprising:

a plurality of elongated conveyor belts arranged above one another in a tiered arrangement;

a means for driving the plurality of elongated conveyor belts located at a near end of the oven; a manifold means for delivering a fuel-air mixture to burners in the oven; the driving means and manifold means collectively located on one side of the oven so that an opposite side of the oven remains unobstructed;

a transfer slide located between two of the elongated conveyor belts at the near end of the oven for transferring product from an upper one of the two elongated conveyor belts to a lower most one of the two elongated conveyor belts; and means for slidably extending the transfer slide out of the side of the oven opposite the drive means and the manifold means for removing debris from the transfer slide.

2. The improved tortilla oven of claim 1 comprising three elongated conveyor belts.

3. The improved tortilla oven of claim 2 wherein the drive means comprises:

a motor driving a shaft of a lower most conveyor belt; and means for transferring rotational movement from the lower most conveyor belt to an upper most and middle most conveyor belt with the upper most conveyor belt rotating in the same direction as the lower most conveyor belt and the inner most conveyor belt rotating in an opposite direction.

4. The improved tortilla oven of claim 1 wherein the transfer slide comprises an upper rail extending substantially as wide as the plurality of conveyor belts, a main arcuate portion extending downward from one side of the upper rail, and a secondary rail extending downward from an opposite side of the upper rail to define a groove for slidably supporting the transfer slide.

5. The improved tortilla of claim 4 further comprising a cross-member supported within the tortilla oven for slidably supporting the groove of the transfer slide.

* * * * *

UNITED STATES PATENT AND TRADEMARK OFFICE
Certificate

Patent No. 5,979,302                                                                     Patented: November 9, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Garrett T. Funk, Fullerton, CA (US); Agustin G. Partida, Bellflower, CA (US); and Michael L. Herrera, Los Alamitos, CA (US).

Signed and Sealed this Twenty-ninth Day of December 2009.

TU B. HOANG
*Supervisory Patent Examiner*
Art Unit 3742